Dec. 26, 1950     K. D. McMAHAN     2,535,689
LUBRICATING ARRANGEMENT FOR HIGH-SPEED SHAFTS
Filed May 27, 1948
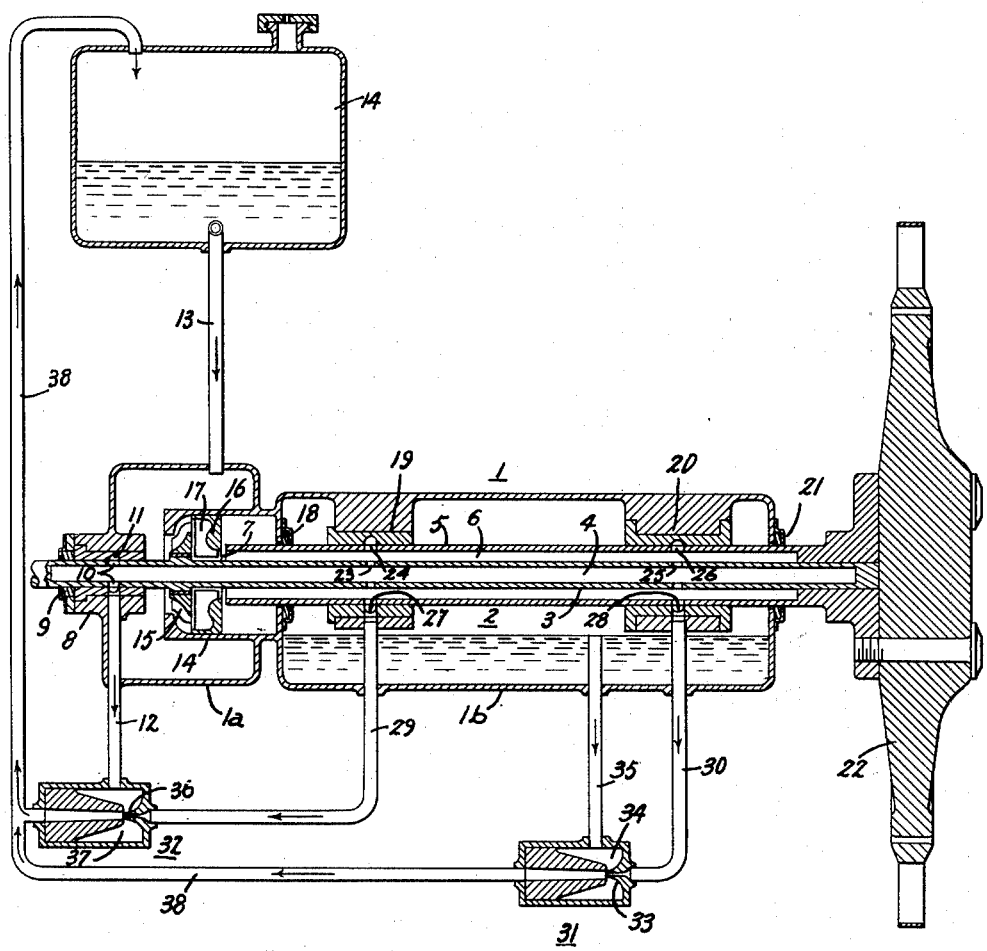
Inventor:
Kenton D. McMahan,
by Prowell S. Mack
His Attorney.

Patented Dec. 26, 1950

2,535,689

UNITED STATES PATENT OFFICE 2,535,689

LUBRICATING ARRANGEMENT FOR HIGH-SPEED SHAFTS

Kenton D. McMahan, Schenectady, N. Y., assignor to General Electric Company, a corporation of New York Application May 27, 1948, Serial No. 29,455

6 Claims. (Cl. 184—6)

This invention relates to lubrication systems for high-speed rotor shafts, particularly to an effective yet simple arrangement for supplying air-free liquid lubricant to the bearings of such a shaft and for returning spent lubricant and foam to a reservoir located above the level of the bearing housing.

The object of the invention is to provide an extremely simple lubrication arrangement of the type described, particularly adapted for use in small, simple, comparatively inexpensive machines, such as small size gas turbine powerplants, having rotor shafts operating at extremely high speeds, of the order of 30,000 R. P. M. and higher. For such an application, it is very necessary that an adequate supply of lubricant be supplied to the bearings at all times, including the critical period during the starting cycle of the powerplant. It is also desirable to circulate an adequate supply of air-free oil for cooling the bearings of a high-temperature machine such as a gas turbine. With the present arrangement, these results are effectively obtained without resorting to any expensive, troublesome, gear-driven mechanical pumps of the type ordinarily used in such lubrication systems.

Other objects and advantages will be apparent from the following description taken in connection with the accompanying drawing, in which the single figure represents diagrammatically a preferred embodiment of the invention.

It will be seen from the drawing that the arrangement includes a suitable bearing housing indicated generally at 1, in which is journalled a composite rotor shaft indicated generally at 2 and including an inner quill shaft 3 having an axial bore 4 closed at both ends and surrounded by an outer quill shaft 5 spaced from the inner shaft to define an annular passage 6. It will be observed that the outer shaft 5 is shorter than the inner shaft so as to define an annular inlet opening 7 adapted to receive liquid lubricant from the bearing housing. At the extreme left-hand end of housing 1 is a journal bearing 8 supporting the inner quill shaft 3 and provided with a suitable oil seal 9. At its left-hand end, the inner quill shaft 3 is provided with a plurality of radially extending holes 10 communicating with an annular groove 11 in the bearing shell. This groove communicates with a conduit 12 which serves a purpose described more particularly hereinafter.

The left-hand end portion 1a of the bearing housing defines a lubricant inlet chamber connected by a conduit 13 to a reservoir 14 located above the level of the bearing housing 1. It will be obvious that liquid from the reservoir 14 flows by gravity through conduit 13 to the inlet housing 1a. Located within housing portion 1a are cylindrical walls 14 forming an annular chamber around the central quill shaft 3 and the adjacent end portion of the outer quill shaft 5. Carried on the inner shaft 3 is a centrifugal impeller or beater rotor 15 having radially extending centrifugal blade members adapted to receive liquid and entrained air and foam from the inlet chamber 1a. Supported in the cylindrical housing 14 adjacent the impeller 15 is an annular member 16 having a plurality of circumferentially spaced radially extending blades 17 shaped so as to receive liquid discharged from the beater rotor 15 and conduct it to the annular inlet 7 of the outer quill shaft 5. A suitable oil seal 18 engages the outer surface of quill shaft 5 and prevents passage of fluid from inlet housing 14 into the main portion 1b of the bearing housing.

Located in the housing portion 1b are a pair of axially spaced journal bearings 19, 20 supporting the outer quill shaft 5. Another oil seal 21 engages the surface of the outer quill shaft and prevents leakage from the right-hand end of the housing. A rotor, such as the gas turbine wheel 22, may be secured to one end of the quill shaft assembly, while the opposite projecting end of the inner quill shaft 3 may be connected to a suitable load device, not shown.

It will be apparent from the drawing that at the location of the bearings 19, 20 the quill shafts are provided with radially extending holes 23, 24, 25 and 26. The openings 23, 25 provide passages communicating between the annular passage 6 and the bore 4 of the internal shaft. The outer sets of holes 24, 26 communicate with annular grooves 27, 28 in the bearing shells. The groove 26 communicates with a conduit 29 and groove 28 is in communication with a conduit 30.

For removing spent lubricant, air, and foam from the bearing housing, pumping means are provided in the form of two injectors 31, 32. The first includes a high-velocity nozzle 33 supplied with actuating liquid from conduit 30, and having an inlet chamber 34 to which spent lubricant flows through conduit 35 from the housing portion 1b. The conduit 35 may be arranged to project above the bottom wall of chamber 1b so as to insure that a certain minimum depth of oil will be retained in the bearing housing 1b at all times. The second injector 32 includes a nozzle 36 supplied with pressure liquid from conduit 29 and having an inlet chamber 37 communicating with conduit 12. Both injectors 31, 32 discharge into a common return conduit 38.

The operation of this lubrication system is as follows. When the machine is inoperative, liquid lubricant will flow from reservoir 14 by gravity so as to completely fill the inlet housing 1a and the main portion of the bearing housing 1b. Thus when the powerplant starts, the bearings 8, 19 and 20 will be completely flooded with oil so as to have adequate lubrication during the starting cycle. As the speed of the shaft increases, the radial passages 24, 26 in the outer quill shaft 5 produce a very strong centrifugal action on the oil in the annular passage 6, with the result that liquid is delivered at a substantial pressure into the grooves 27, 28, whence it flows through conduits 29, 30 respectively to the injectors 32, 31. The high velocity jets from the injector nozzles 33, 36 produce a strong aspirating effect on the conduits 12, 34. Excess liquid in the housing 1b is thereby drawn through conduit 35, and returned to tank 14 through the discharge conduit 38. Thus during operation the oil level in the housing 1b is maintained substantially below the bearings 19, 20, so that the quill shaft rotates in air and excessive agitation and beating up of the oil is avoided.

The effect of the agitator rotor 15 is to centrifugally separate liquid lubricant from entrained foam and air. The denser liquid is thrown radially outward, while the lighter entrained air and foam tends to form in effect a central "core" within the rotating body of liquid. The radially extending vanes 17 in the deflector member 16 supply the liquid and foam to the annular inlet 7 of the passage 6. In passage 6, the liquid tends to flow along the inner surface of quill shaft 5 and outwardly through the holes 24, 26, so that the bearings 19 and 20 are supplied with abundant air-free liquid, which effectively cools and lubricates them. As a matter of fact, the cooling effect of this air-free liquid is so good that the temperature of the bearings may be only three or four degrees Fahrenheit higher than the oil temperature, in spite of the fact that an appreciable amount of heat may be transferred by conduction from the rotor 22 and associated hot parts along the shafts 3, 5.

The entrained air and foam, which flows through the annular passage 6 along the outer surface of the inner shaft 3, is drawn inwardly through the openings 23, 25, into the axial bore 4 of the inner quill shaft. The action of the injector 32 is to draw this entrained air and foam through conduit 12, discharging it through the return line 38 to tank 14. Thus it will be seen that the centrifugal action of the beater rotor 15 and the centrifugal forces acting on the oil and foam in the annular passage 6 effectively serve to separate liquid from foam, so that the bearings receive only air-free liquid and the entrained foam is positively drawn off by the injector 32.

My improved lubrication arrangement has been found extremely effective in connection with the rotor of a small gas turbine powerplant having a shaft designed for a normal operating speed in the range of 30,000 to 40,000 R. P. M. The arrangement efficiently supplies air-free lubricant to the bearings and scavenges spent lubricant from the bearing housing by simple, cheap injector pump means having a long, trouble-free life by reason of the absence of moving parts, drive gears, etc. In the event that there should be a break in an oil line or some similar failure in the system, lubricant will be supplied by gravity through conduit 13 so that the bearings will be safely lubricated until the powerplant can be shut down. Besides serving as a centrifuge to separate liquid from foam, the rotor 15 also serves to prime the passage 6 with oil under a slight positive pressure.

It has been found that with a quill shaft 5 of the order of 1 inch in diameter, and rotational speeds above about 7,000 R. P. M., actuating liquid will be supplied to the injectors 31, 32 at pressures sufficiently high to scavenge excess oil and foam from case 1b and remove air from quill shaft 3.

While a preferred embodiment of the invention has been illustrated and described, it will be readily apparent to those skilled in the art that many changes might be made, and I desire to cover by the appended claims all such modifications as fall within the true spirit and scope of the invention.

What I claim as new and desire to secure by Letters Patent of the United States is:

1. In a lubrication system for a high-speed shaft, the combination of two coaxial quill shafts, the inner one having a central bore and the outer one spaced from the inner to form an annular passage, a sealed bearing housing, bearing means in the housing supporting the outer quill shaft, a lubricant reservoir above the level of the bearing means, conduit means connecting the reservoir with a first portion of the housing whereby lubricant flows by gravity to said housing portion, first jet pump means with a suction conduit for removing liquid from a second portion of the housing and a discharge conduit for returning it to the reservoir, second jet pump means with a suction conduit for removing air and foam from said central bore, centrifugal pump means including a rotor connected to the quill shafts for rotation therewith and having an inlet receiving oil and foam from said first housing portion, and walls defining passages for admitting oil and foam from the rotor to said annular passage, the outer shaft having radial passages for supplying foam-free liquid under pressure from the annular passage for lubricating the bearing means, and conduit means for supplying liquid from the annular passage to the jet inlets of said jet pumps.

2. In a lubrication system for a high-speed shaft, the combination of a rotor shaft assembly including an inner shaft having a central bore and an outer coaxial shaft shorter in length than the inner shaft and spaced therefrom to define an annular passage open at one end, a sealed bearing housing defining a liquid inlet chamber communicating with the open end of the annular passage, first bearing means supporting the projecting end of the inner shaft, axially spaced second and third bearings in the housing supporting the outer shaft, a lubricant reservoir above the level of the bearing means, first conduit means connecting the reservoir to the inlet chamber whereby liquid lubricant flows by gravity to said chamber, and scavenging pump means for returning liquid and foam to the reservoir including first and second jet pumps discharging into a return conduit to the reservoir, second conduit means for supplying liquid from the bearing housing to the suction chamber of the first jet pump, third conduit means for supplying air and foam from the bore of the inner shaft to the suction chamber of the second jet pump, centrifugal pump means including radially extending passages in the outer shaft, radial passages in the inner shaft for admitting air and foam from the annular passage to said central bore, and other conduit means for supplying liquid under pressure from said centrifugal pump means to the jet inlets of the jet pumps, whereby liquid from the bearing housing and air and foam from the central bore of the inner shaft are returned to the reservoir.

3. A lubrication system in accordance with claim 2 and including a centrifugal agitator mounted to rotate with the shafts for centrifugally separating foam from liquid and supplying both at a positive pressure to the annular passage defined between the coaxial hollow shafts.

4. In a lubrication system for a high-speed shaft, the combination of two hollow coaxial shafts, the inner one having a central bore and the outer spaced radially from the inner to form an annular passage, the outer shaft having radially extending passages for the discharge of air-free liquid, the inner shaft having ports for the withdrawal of air and foam into the central bore thereof, centrifugal pump means including a rotor mounted to rotate with said shafts to centrifugally separate foam from liquid and supply both under a positive pressure to said annular passage, and pump means with a suction conduit connected to withdraw entrained air and foam from said central bore of the inner shaft.

5. In a lubrication system for a high-speed shaft, the combination of a rotor shaft assembly including an inner shaft having a central bore and an outer coaxial shaft shorter in length than the inner shaft and radially spaced therefrom to define an annular passage open at one end, the inner shaft having radial passages communicating with the central bore and said annular passage, a sealed bearing housing surrounding the shafts and defining a liquid inlet chamber communicating with said open end of the annular passage, first bearing means supporting the projecting end of the inner shaft, axially spaced second and third bearings in the housing supporting the outer shaft, a lubricant reservoir located above the level of the bearing means, first conduit means connecting the reservoir to the inlet chamber whereby liquid lubricant flows by gravity to said chamber, pump means for returning liquid and foam to the reservoir including first and second jet pumps, second conduit means for supplying liquid from the bearing housing to the suction chamber of the first jet pump, third conduit means including radially extending passages in the projecting end portion of the inner shaft for supplying air and foam from said central bore to the suction chamber of the second jet pump, centrifugal pump means including radially extending passages in the outer shaft, and other conduit means for supplying liquid under pressure from said radial passages in the outer shaft to the jet inlets of said jet pumps whereby liquid from the bearing housing and air and foam from the central bore of the inner shaft are returned to the reservoir.

6. A lubrication system in accordance with claim 5 and including a centrifugal rotor mounted on the shaft assembly and having an inlet receiving fluid from the inlet chamber and a discharge for delivering fluid at a positive pressure to the annular passage between the coaxial shafts whereby liquid is centrifugally separated from entrained air and foam.

KENTON D. McMAHAN.

REFERENCES CITED

The following references are of record in the file of this patent:

UNITED STATES PATENTS

| Number | Name | Date |
| --- | --- | --- |
| 2,457,999 | Hulbert | Jan. 4, 1949 |